United States Patent [19]

Wang

[11] Patent Number: 4,897,805
[45] Date of Patent: Jan. 30, 1990

[54] METHOD AND APPARATUS FOR PERFORMING POLYGON FILLS IN GRAPHICAL APPLICATIONS

[75] Inventor: Jane Wang, Framingham, Mass.

[73] Assignee: Prime Computer, Inc., Natick, Mass.

[21] Appl. No.: 194,832

[22] Filed: May 17, 1988

[51] Int. Cl.[4] .................................................. G09G 1/00
[52] U.S. Cl. .................................... 364/521; 340/723; 340/750; 382/44
[58] Field of Search ......................... 364/518, 521, 520; 340/723, 728, 734, 737, 739, 747, 750; 382/48, 44, 45

[56] References Cited

U.S. PATENT DOCUMENTS

| | | | |
|---|---|---|---|
| 4,481,594 | 11/1984 | Staggs et al. | 364/521 |
| 4,566,126 | 1/1986 | Miyagawa et al. | 382/48 |
| 4,646,076 | 2/1987 | Wiedenman et al. | 340/750 X |
| 4,725,831 | 2/1988 | Coleman | 340/747 |
| 4,736,200 | 4/1988 | Oununa | 340/734 |
| 4,758,965 | 7/1988 | Liang et al. | 364/518 |
| 4,791,582 | 12/1988 | Ueda et al. | 364/522 |

OTHER PUBLICATIONS

J. D. Foley and A. Van Dam, *Fundamentals of Interactive Computer Graphics*, 1983, pp. 456–458.

Primary Examiner—Gary V. Harkcom
Assistant Examiner—H. R. Herndon
Attorney, Agent, or Firm—Wolf, Greenfield & Sacks

[57] ABSTRACT

A method of filling a polygon as represented on a scan-line raster display includes storing data representative of the polygon edges, computing the points of intersection of a scan-line with each polygon edge, assigning a count having a parity value to each crossed-edge, and combining all colinear horizontal edges at the points of intersection. The number of polygon edges positioned above the colinear horizontal edge and which have a vertex coincident with the colinear horizontal edge, as well as the number of polygon edges positioned below the colinear horizontal edge and which have a vertex coincident with the colinear horizontal edge, are calculated. The parity of the crossed-edge count is inverted if the parity of both the above edge count and below edge count are even, and the string of pixels along the raster display scan-line from the current edge intersection to the next edge intersection are modified if the parity of the crossed-edge count is odd.

13 Claims, 4 Drawing Sheets

METHOD AND APPARATUS FOR PERFORMING POLYGON FILLS IN GRAPHICAL APPLICATIONS

BACKGROUND OF THE INVENTION

1. Field of Invention

The present invention relates to the field of computer graphics and in particular concerns a method and apparatus for determining how a computer-generated polygon shape should be filled.

2. Background Discussion

Most modern computer graphic systems use raster technology to display images. In raster technology displays, lines, characters and solid areas, usually represented as polygons, are stored in computer memory as groups of fundamental units known as picture elements or "pixels." Pixels are arranged into horizontal strings called raster lines. These raster lines are organized vertically to form a pixel matrix or "raster". Images are formed on the raster and are scanned out sequentially one raster line at a time onto the display screen by an electron beam which varies the intensity of each pixel.

A polygon is comprised of a number of sides or edges which are represented in computer memory as pairs of Cartesian coordinates (x,y) corresponding to the edge vertices. Traditionally, once the edges defining the polygon were stored in memory, an algorithm known as the "standard-fill" or "scan-line" algorithm, horizontally scans each raster line computing the number of polygon edges intersected by the scan-line. When the scan-line intersects a polygon edge it determines the number of polygon edges currently crossed. If the number crossed edges is odd, for example, three, indicating that the current crossed edge is the third thus far, the string of pixels in that particular raster line is modified or "filled" from the current edge intersect till the next edge intersect, at which point the crossed edge count becomes even. When the crossed edge count becomes even, the pixels along the raster line from the current crossed edge intersect to the next edge intersect are not filled.

The scan-line algorithm works adequately with simple polygon shapes, however, it yields undesirable results in special cases of horizontal edges or intersecting vertices at a point of intersection along the currently scanned raster line.

Accordingly, it is an object of the present invention to provide an improved scan-line algorithm which is capable of determining when to perform a fill between polygon edges, particularly in the special cases of intersecting vertices or horizontal edges along the scan-line.

It is a further object of the present invention to provide an apparatus for executing the above mentioned method in a computer graphic system.

SUMMARY OF THE INVENTION

To accomplish the foregoing objectives, there is provided an improved method for filling polygon shapes in computer graphic applications and apparatus for implementing such method. The present invention provides an enhancement to a conventional scan-line algorithm enabling the algorithm to determine when to perform pixel modifications between polygon edges if two or more vertices or a horizontal edge are present at the intersection of the scan-line and a polygon edge.

The present invention deals with method of generating polygon images in the raster prior to their scanning and viewing by the user. In particular the present invention deals with a method and apparatus for determining which regions of a polygon or polygons should be filled with color.

The present invention is characterized basically by three function steps added to the conventional scan line algorithm. First, at the point of intersection of the scan-line with a polygon edge, intersecting vertices and all horizontal edges that are colinear with the scan-line are combined into a single colinear horizontal edge. For example, if the scan-line intersected a square at the upper-left vertex, the top edge of the square would be considered a single crossed edge.

Second, the number of polygon edges positioned above the colinear horizontal edge and which have a vertex coincident with the colinear horizontal edge are calculated. Likewise, the polygon edges positioned below the colinear horizontal edge and which have a vertex coincident with the colinear horizontal edge are calculated. In the square example above, no polygon edges lie above the top edge of the square, therefore the above edge count is zero. On the other hand, the vertical edges forming the sides of the square fall below the colinear horizontal edge (square top edge) and share the upper corner vertices with top edge of the square. Therefore, the below edge count is two.

In the third and final step of the present invention, the above and below polygon edge counts are compared and a fill operation performed depending on the results of the comparison If either the polygon edge count above the colinear horizontal edge or below the colinear horizontal edge is an odd number, the improved scan line algorithm fills the pixel string along the scan-line between the current intersected polygon edge and the next intersected polygon edge according to the conventional scan-line algorithm, that is based on the parity, i.e. evenness or oddness, of the current crossed edge count. Therefore, in the case of odd numbers of polygon edges falling above or below the currently crossed edge, the improved algorithm acts similar to a conventional scan-line algorithm. In the event that the polygon edge count above and below the colinear horizontal edge are both even, as in the square example, where the above edge count is zero and the below count is two, the parity of the current crossed edge is inverted thereby causing the opposite result of the conventional scan-line algorithm.

With these enhancements to the conventional scan-line algorithm, special case situations of multiple horizontal edges within a polygon configuration or polygons within polyqons present little problem in determining whether a string of pixels from one intersected polygon edge to the next intersected polygon edge should be filled or not filled.

The present invention further includes apparatus for implementing this improved scan-line algorithm by means of encoding the algorithm into assembly language and storing it in standard computer logic and memory elements such as erasable programmable read-only (EPROM) memory devices.

BRIEF DESCRIPTION OF THE DRAWINGS

Numerous other objects, features and advantages of the present invention should now become apparent upon a reading of the following detailed description taken in conjunction with the accompany drawings in which.

DETAILED DESCRIPTION OF THE INVENTION

Figure 1:
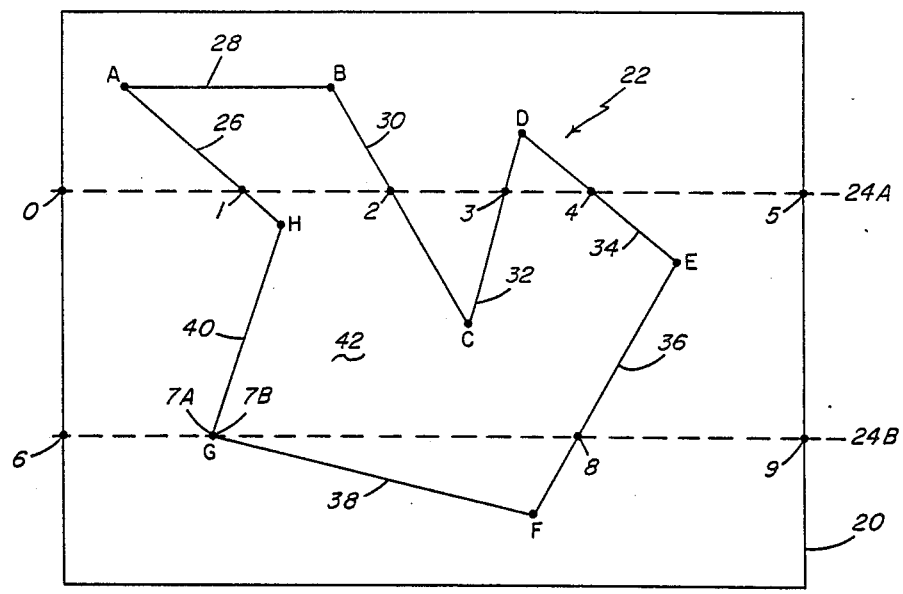
FIG. 1 represents a simple polygon shape, a number of horizontal scan-lines and the points of intersection between the scan-lines and polygon edges.
Figure 3:
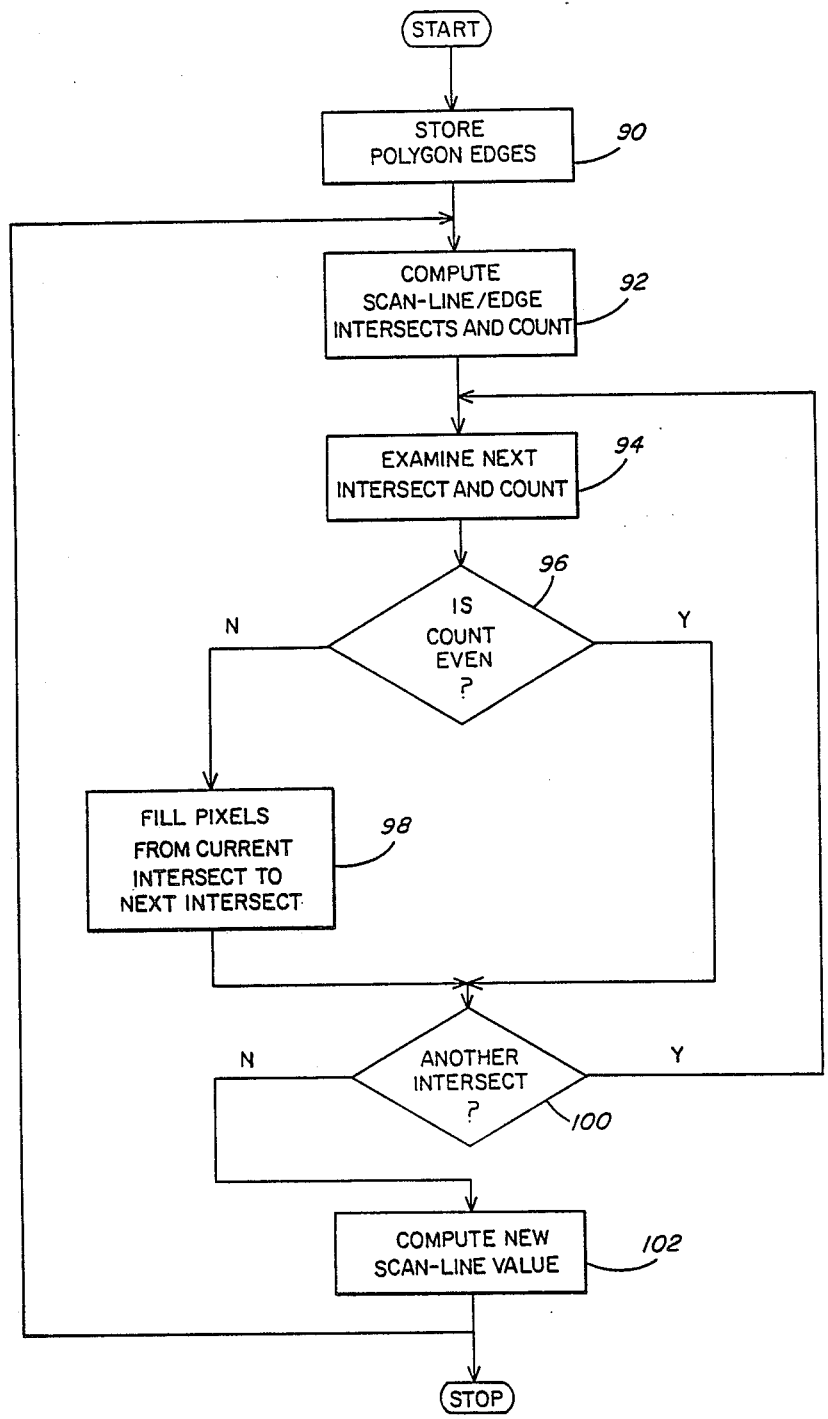
FIG. 3 is a simplified flow chart of the algorithm steps used in a conventional scan-line polygon fill algorithm.

Reference is now made to the drawings and in particular FIGS. 1 and 3. FIG. 1 represents raster 20 on which a simple polygon shape 22 is represented as a collection of contiguous edges 26–40 and vertices A-H forming a closed figure. Polygon 22 is represented in the computer memory in the form of a data table containing information on the individual edges of the polygon, as indicated by step 90 in the flow chart of FIG. 3. The individual edges may be represented by storing the x y coordinates representing the vertices of the edge.

Typically, once polygon 22 is defined in the computer memory as an edge table, a program subroutine including the conventional scan-line algorithm, represented by steps 92–102 in FIG. 3, fills the interior 42 of polygon 22 one raster line at a time using a scan-line 24A. Scan-line 24A moves from the top of raster 20 to the bottom or vice versa traversing each raster line along the x-axis and intersecting edges 26–40. The intersection points between scan-line 24A and polygon edges $26 \geq 40$ are calculated by setting the y value in the equation of a line, $y = mx + b$, equal to the current scan-line position along the y-axis, and then solving for the x value. This x value represents the intersection of the scan-line with a polygon edge. Each intersection is assigned a sequential value representing the number of edges currently crossed. These intersection calculations and count assignments are indicated by step 92 in FIG. 3.

The conventional scan-line algorithm decides to fill or not fill the string of pixels existing between the current polygon edge intersection and the next polygon edge intersection based on the parity of the current crossed-edge count. If the current crossed edge count is even, no fill will be performed along the pixel string from the current edge intersection to the next edge intersection. If the current cross edge count is odd, a fill operation will be performed along the same interval. Steps 94–98 in FIG. 3 illustrate these algorithmic steps used by conventional scan-line algorithm.

In order to better understand the present invention, it is necessary to understand the defects of the conventional scan-line algorithm as exemplified with the following example.

Referring again to FIG. 1, scan-line 24A intersects polygon 22 at edges 26, 30, 32 and 34. The intersections of the scan-line 24A with both the raster 20 boundaries and the polygon 22 are numbered 0-5. The traditional algorihm starts with intersection 0 at the boundary of the raster. At this point the crossed edge count is zero. Since zero is an even number, the traditional algorithm will not fill the pixel strings along the scan-line between intersection point 0 and intersection point 1. Next the algorithm examines intersecting point 1. At this point, the crossed edge count is one, scan-line 24A having intersected edge 26. Since one is an odd number, the algorithm executes a fill operation on the string of pixels from intersection point 1 to intersection point 2. At intersection point 2, representing the intersection of scan-line 24A with edge 30, the crossed edge count is two. Since two is an even number, the interval of pixels from intersection point 2 to intersection point 3 are not filled. At intersecting point 3, representing the intersection of the scan-line 24A with edge 32 the crossed edge count is three. Since there is an odd number, the interval of pixels along the scan-line from intersecting point 3 to intersection point 4 is filled. Finally, at intersecting point 4 the crossed edge count, four, is even, therefore no fill will be performed for the pixel string from interection point 4 to intersection point 5 representing the intersection of the scan-line 24A with the raster boundary. The scan-line moves then along the y-axis to the next raster line, since the current raster line is now scanned and filled.

Note, what happens when the scan-line reaches the position notated as scan-line 24B. At this raster line, scan-line 24B intersects polygon 22 at vertex G and edge 36. Due to the nature of representing a polygon as a set of edges in computer memory, the intersection of scan-line 24B at vertex G is seen by the conventional scan-line algorithm as two crossed edges one for the vertex G of edge 40 and the other for vertex G of edge 38 represented in FIG. 2 as intersection points 7A and 7B respectfully. The crossed edge count at intersecting point 7A is one. Since one is an odd number, a fill operation will be performed along the pixel string from intersecting point 7A to the next intersecting point 7B regardless of the fact that both intersecting points represent the same location. Because of this flaw in the conventional scan-line algorithm a fill is performed on as pixel string that begins and ends in the same location. The next edge intersection 7B has a crossed-edge count of two. Since two is an even number, a fill operation is not performed between intersecting point 7B and 8 where one normally should be performed. At intersecting point 8 the crossed-edge count is now three. Three being an even number, the pixels along the raster line between intersecting point 8 and 9 are filled. It is apparent from the above example that the conventional scan-line algorithm works poorly with cases of intersecting vertices.

The solution of representing the intersection of a scan-line with a vertex as just one crossed edge also yields improper results, particularly in instances where a vertex represents a local minimum or maximum y value.

From the above analysis of the simple polygon of FIG. 1, the need for an algorithm which can deal with not only intersecting vertices but horizontal lines and other complex polygon configurations is apparent The polygon fill method of the current invention is capable of dealing with all of the above mentioned special situations.

Figure 4:
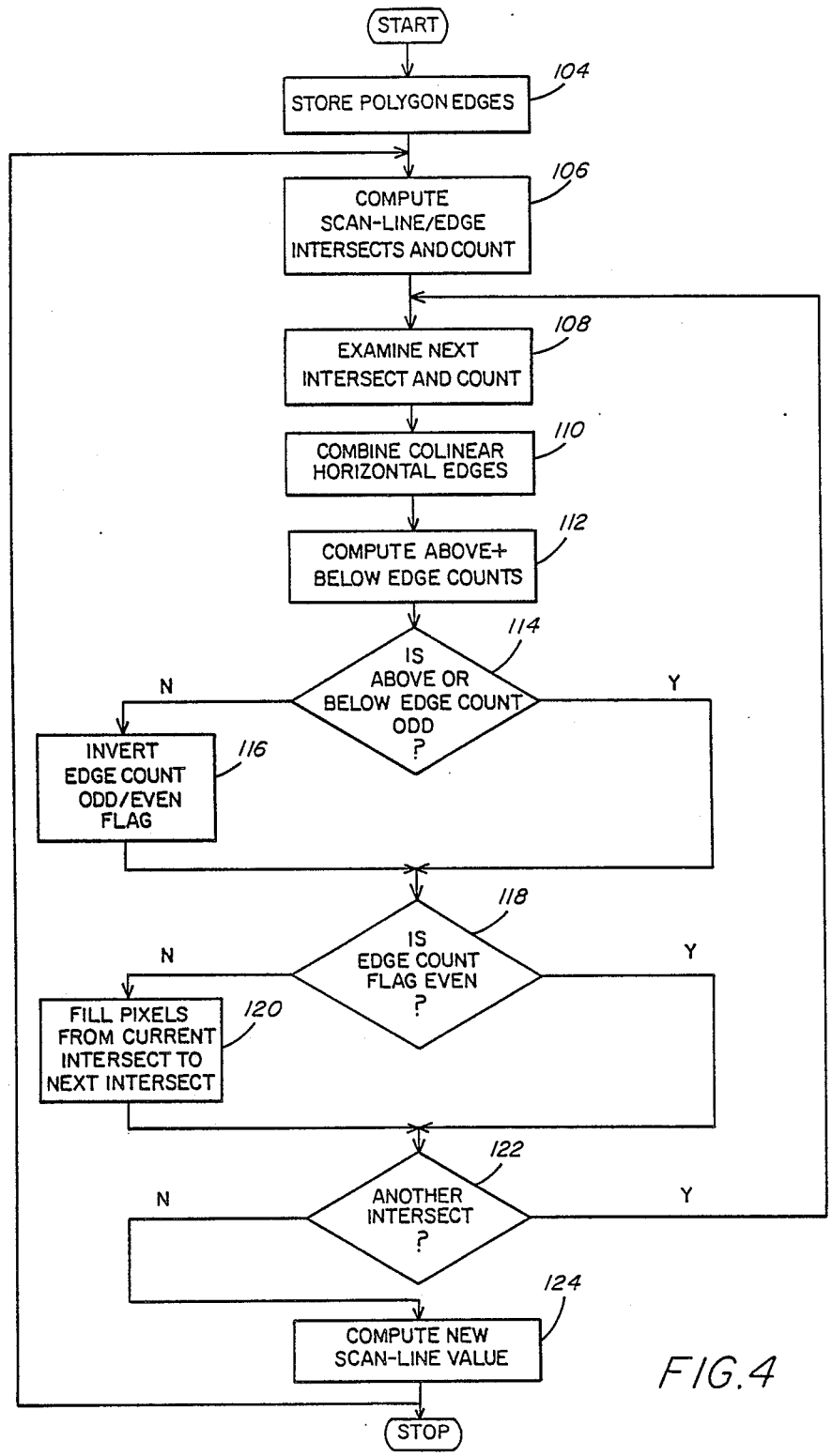
FIG. 4 is simplified flow chart of the algorithmic steps of the present invention used to enhance a traditional scan-line polygon fill algorithm.

In the preferred embodiment of the present invention, an edge table capable of representing up to 256 edges of a polygon or polyqons, is set up in the computer memory wherein vertex coordinates and other data for each polygon edge, are stored as indicated by step 104 of FIG. 4. As previously outlined, the equation of a line is used to calculate the intersection points of the current scan-line with the polygon edges, as indicated by step 106 in FIG. 4.

In the preferred embodiment of the present invention, a data table is set up in the computer memory with each entry representing the x-coordinate of an intersecting point of the current scan-line with a polygon edge. This x-coordinate data table is structured as a forwardly-linked list in which each data entry in the link can access the next entry representing the next intersecting point of the scan-line with a polygon edge. A crossed-edge count is assigned to each link in the x-coordinate table. The first link or entry, representing the first polygon edge crossed by the scan-line is assigned a value of one, the next entry, representing the next polygon edge intersected by the scan-line is assigned a value of two and so.

The essential element of the present invention, is the method by which fills are made along the scan line between consecutive intersected edges. Steps 110-116 of FIG. 4 illustrate the algorithm steps of the present invention used to improve a conventional scan-line algorithm. The current invention includes a basic three step method for determining whether to fill or not fill the pixel string along the current scan-line between two edge intersection points.

Once a table containing all the intersecting points of the scan-line with the polygon edges is compiled, the first step, as represented by step 110 in FIG. 4, combines all horizontal edges and vertices that are colinear with the currently intersected edge. In doing this, intersecting vertices are now represented in the x-coordinate table as a single x intersection point instead of two or more intersection points. Likewise, a horizontal edge with two or more intersecting vertices is represented as a single intersection with the scan-line 24B.

The second step calculates the number of polygon edges that intersect the current colinear horizontal edge or share a vertex with the current colinear horizontal edge and have a second vertx with a y coordinate greater than that of the y coordinate of the current scan line, in other words, those edges above the colinear horizontal edge. Likewise, the number of polygon edges which intersect the current colinear horizontal edge or share a vertex with the current colinear horizontal edge and have a second vertex with a y coordinate less than that of the scan-line in other words, those edges below the colinear horizontal edge ar calculated. Put simply, the number of polygon edges falling both above and below the current colinear horizontal edge are calculated, as indicated by step 112 in FIG. 4.

In the third step, the parity of the above and below edge counts are compared. If the number of edges above the colinear horizontal edge or below the colinear horizontal edge count is odd then the conventional scan-line algorithm is followed and a fill is made if the current crossed edge is odd. In the event that the edge count above the colinear horizontal edge and below the colinear horizontal edge are both even, the parity of the current crossed edge count is inverted, as indicated by steps 114-116 in FIG. 4. In other words, if the current edge count was even it will now be changed to odd and a fill performed on the pixel string between the current edge intersection and the next edge intersection. Likewise, if the current crossed edge count was odd it will be changed to even and no fill will be preformed on the pixel string between the current edge intersection and the next edge intersection.

With these additional steps added to a traditional scan-line polygon fill algorithm, the improved algorithm is now capable of dealing with situations of intersecting vertices horizontal edges coincident with the scan-line and polyqons within polyqons.

Figure 2:
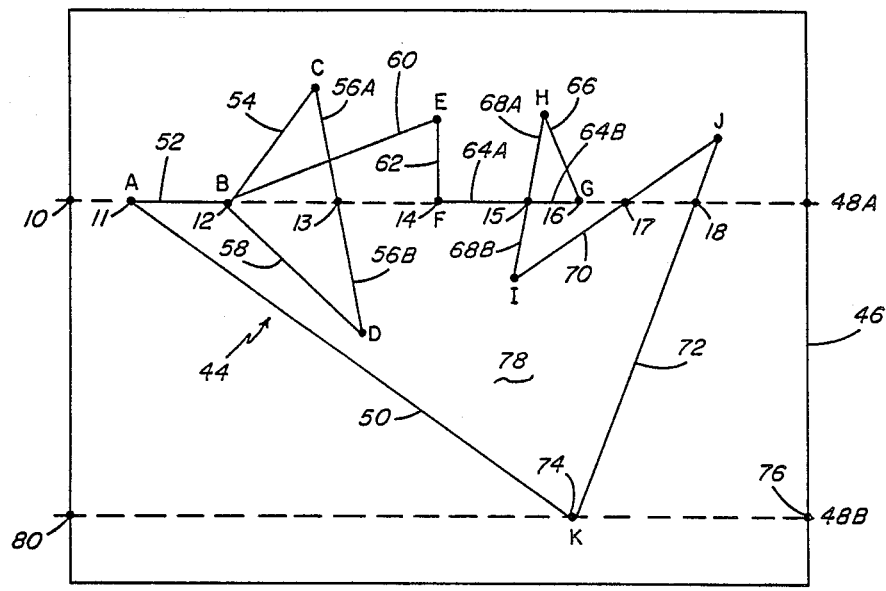
FIG. 2 represent a more complex polygon configuration containing multiple horizontal edges and internal polygons as well as a number of horizontal scan-lines and the corresponding intersecting points between the scan-lines and polygon edges.

The improved algorithm of the present invention is best appreciated by looking at a specific example. In FIG. 2, a raster 46 contains a complex polygon configuration 44. Complex polygon 44 includes vertices A through K and edges 50 through 72 interconnecting those vertices. At intersection point 10 representing the intersection on the scan-line 48A with the left boundary of raster 46 the current crossed edge count is zero. Since zero is an even number no fill will be performed on the pixels along the scan-line between intersection point 10 and intersection point 11. Next, at intersecting point 11 representing the intersection of scan line 48A with horizontal edge 52, all colinear horizontal edges are combined. Therefore, edge 52 including vertices A and B is considered a single crossed horizontal edge having an odd crossed edge count of one. Next, the number of horizontal edges above the colinear edge 52 that share a vertex are counted. Polygon edge 54 and 60 both share vertex B with horizontal edge 52 and lie above the colinear horizontal edge 52 resulting in an above edge count of two. Likewise, below the horizontal edge 52, polygon edge 58 shares vertex B with horizontal edge 52, and polygon edge 50 shares vertex A with horizontal edge 52, also resulting in a below edge count of two.

According to the improved algorithms since the number of polygon edges lying above the colinear horizontal edge and below the colinear horizontal edge ar both even, the parity of the currently crossed edge count is inverted. The crossed edge count of the currently crossed edge extending from vertex A through B is one, and therefore odd. The parity of the crossed edge count is then inverted to become even. According to the conventional scan-line algorithm an even number does not fill the pixel string extending from the current crossed edge intersection to the next crossed edge intersection. Therefore, the pixels extending from intersection point 12 to intersection point 13 are not filled.

At intersection point 13 there are no colinear edges to be combined. Since the parity of the last crossed edge was converted to even, the current crossed edge count parity is odd and accordinq to the conventional scan-line algorithm a fill will be performed on the pixels along the scan-line between intersection points 13 and 14.

At intersection point 14 all horizontal colinear lines are combined. Therefore, intersecting points 14, 15 and 16 along edge 64 are combined to represent the current crossed edge. Next, the above and below edge counts are calculated. Edges 62, 68A, and 66 all lie above the current crossed edge and either share a vertex with the current crossed edge or intersect the current crossed edge, resulting in an odd above edge count of three. Edge 68B lies below the current crossed edge and intersects the current crossed edge resulting in an odd below edge count of one.

In accordance with the present invention, since both the above and below edge counts are odd, no modification will be made to the parity of the current crossed edge count value. The current crossed edge count is even, since the last crossed edge count at intersection point 3 was odd. Accordinq to the conventional scan-line algorithm, a fill is not performed at an even count crossed edge, therefore, the string of pixels from intersection point 16 to intersection point 17 will not be filled.

At intersection point 17, there are no colinear horizontal edges to be combined. The current crossed edge count at point 17 has odd parity since the previous crossed edge count at point 16 was even. Since the current crossed edge count is odd, the string of pixels from intersection point 17 to intersection point 8 will be filled in accordance with the conventional scan-line algorithm.

Finally, at intersection point 18, there are no colinear horizontal edges to be combined and the current crossed edge count is even. Therefore, in accordance with the conventional scan-line algorithm, the string of pixels from intersection point 18 to intersection point 19 will not be filled.

Scan-line 48A moves along the y axis traversing each raster line in a similar manner and filling polygon 44 one scan-line at a time. When the scan-line reaches the position notated as 48B, the scan-line 48B intersects polygon 44 at vertex K. At intersection point 74 indicating the intersection of scan-line 84B with vertex K, there are no colinear horizontal edges to be combined. However, edges 50 and 72 have intersecting vertices at vertex K. Since vertex K is considered the currently crossed edge, the edge counts above and below vertex K are calculated. Edges 50 and 72 lie above the currently crossed edge and share a vertex coincident with the currently crossed edge, resulting in an even above edge count of two. The below edge count at the currently crossed edge is zero. According to the third step of the present invention, when both the above and below edge counts are even the parity of the current crossed edge count is inverted. Since vertex K is the first crossed edge encountered by scan-line 48B the current crossed edge count is one and odd. Accordingly, the parity of the crossed edge count is inverted from odd to even and therefore, no fill is performed on the pixel string from intersection point 74 to intersection point 76 representing the boundary of raster 46.

Figure 5:
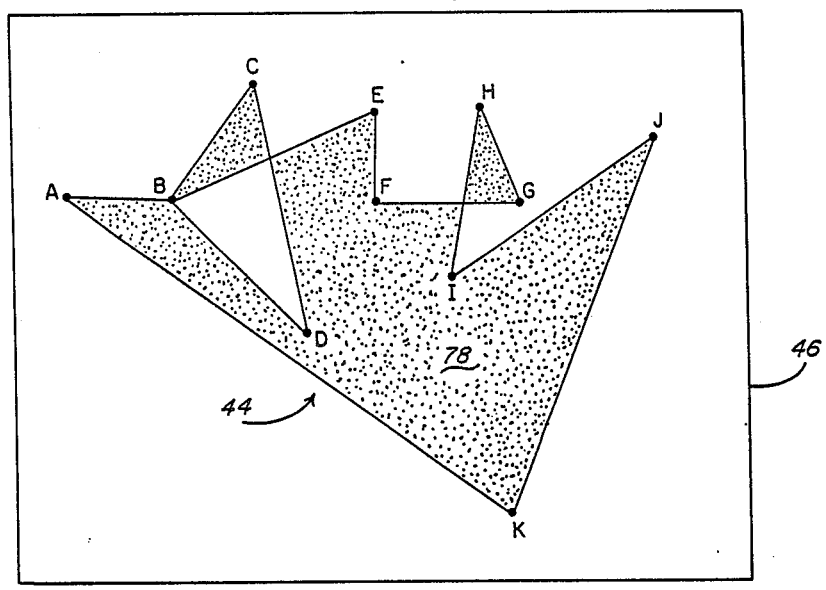
FIG. 5 illustrates the results of the improved scan-line algorithm according to the present invention as applied to the complex polygon configuration of FIG. 2.

In a similar manner, the rest of polygon 44 is scanned and filled. FIG. 5 illustrates the results of polygon 44 as filled by the improved scan-line algorithm of the present invention.

The present invention can be implemented as an apparatus by encoding the improved scan-line algorithm into an assembly language program and storing the program in conventional computer memory elements such as read only memory (ROM) or erasable programmable read only memory (EPROM) for use in conjunction with a computer graphic system hardware and a conventional operating system.

Having now described a limited number of embodiments of the present invention, it should be apparent to those skilled in the art that numerous other embodiments and modifications thereof are contemplated as falling within the scope of the present invention as defined by the appended claims.

What is claimed:

1. A method of filling computer-generated polygon shapes, said shapes being formed on a matrix of pixels which is organized into individual horizontal raster lines, comprising the steps of:
   (a) storing data representative of the vertices defining each polygon edge;
   (b) computing points of intersection along one of said raster lines of a scan-line with said polygon edges, and assigning a crossed-edge count and a parity value based on said crossed edge count to each of said of intersections;
   (c) combining at said point of intersection all horizontal edges which are colinear with said scan-line and all intersecting vertices into a colinear horizontal edge;
   (d) calculating the number of polygon edges positioned above said colinear horizontal edge which have a vertex coincident with said colinear horizontal edge into an above edge count;
   (e) calculating the number of polygon edges positioned below said colinear horizontal edge and which have a vertex coincident with said colinear horizontal edge into a below edge count;
   (f) comparing said above edge count and said below edge count, whereby if both said above edge count and said below edge count have even parity, the parity of the crossed-edge count of the colinear horizontal edge is inverted; and
   (g) modifying the string of said pixels along said raster line from the current point of intersection to the next point of intersection accordinq to the parity of said crossed-edge count, said modification being executed if the parity of said crossed-edge count is odd and said modification not executed if the parity of said crossed-edge count is even.

2. The polygon fill method of Claim 1 wherein said steps (c) through (g) are repeated until the last said point of intersection along said raster line is reached.

3. The polygon fill method of Claims 1 or 2 wherein said steps (b) through (g) are repeated until the last of said raster lines in said pixel matrix is scanned.

4. A method of filling polygon shapes, said shapes formed on a matrix of pixels which is organized into individual horizontal raster lines, and whereby each polygon is represented in computer memory as a set of polygon edges defined by the coordinates of the edge vertices, said method comprising the steps of:
   (a) computing points of intersection along one of said raster lines of a scan-line with said polygon edges, and assigning crossed-edge count and a parity value based on said crossed-edge count to each of said intersections,;
   (b) combining at said point of intersection all horizontal edges which are colinear with said scan-line and all intersecting vertices into a colinear horizontal edge;
   (c) calculating the number of polygon edges positioned above said colinear horizontal edge and which have a vertex coincident with said colinear horizontal edge into an above edge count;
   (d) calculating the number of polygon edges positioned below said colinear horizontal edge which have a vertex coincident with said colinear horizontal edge into a below edge count;
   (e) comparing said above edge count and said below edge count whereby if both said above edge and said below edge count have even parity, the parity of the crossed-edge count of the colinear horizontal edge is inverted; and
   (f) modifying the string of said pixels along said raster line from the current point of intersection to the next point of intersection according to the parity of said crossed-edge count, said modification being executed if the parity of said crossed-edge count is odd and said modification not executed if the parity of said crossed-edge count is even.

5. The polygon fill method according to Claim 4 wherein said steps (b) through (f) are repeated until the last of said point of intersection along said raster line is reached.

6. The polygon fill method according to Claims 4 or 5 whereby said steps (a) through (f) are repeated until the last of said raster line in said pixel matrix is scanned.

7. A method of filling a polygon as represented on a scan-line raster display, comprising the steps of, storing data representative of the location of a polygon edge, computing the points of intersection of a scan-line with each polygon edge, combining colinear horizontal edges at the points of intersection, calculating the number of polygon edges positioned above the colinear horizontal edge and which have a vertex coincident with the colinear horizontal edge, calculating the number of polygon edges positioned below the colinear horizontal edge, inverting the parity of the crossed-edge count it the parity of both the above edge a count and the below edge count are even and modifying the string of pixels along the raster line from the current point of intersection to the next point of intersection according to the parity of the crossed count.

8. A polygon fill method as set forth in claim 7 including the further step of modifying if the parity of the cross-edge count is odd and not modifying if the parity of the cross-edge count is even.

9. An apparatus for filling a polygon as represented on a scan-line raster display, comprising, means for storing data representative of the location of a polygon edge, means for computing the points of intersection of a scan-line with each polygon edge, means for combining colinear horizontal edges, means for calculating the number of polygon edges positioned above the colinear horizontal edge and which have a vertex coincident with the colinear horizontal edge, means for calculating the number of polygon edges positioned below the colinear horizontal edge and which have a vertex coincident with the colinear horizontal edge, means for modifying the crossed-edge count if the parity of the above edge count and the below edge count are even, and means for modifying the string of pixels along the raster line from the current point of intersection to the next point of intersection according to the parity of the crossed-edge count.

10. A polygon fill apparatus as set forth in claim 9 comprising means for modifying if the parity of the cross-edge count is odd and not modifying if the parity of the cross-edge count is even.

11. Apparatus according to claim 9 wherein said apparatus comprises a programmable memory means.

12. The apparatus according to claim 9 wherein said apparatus comprises a programmable memory means.

13. A method of filling polygons represented on a scan-line raster display as a plurality of edges having common vertices, said scan-line crossing or intersecting the polygon edges a discernable number of times, said method comprising the steps of:
 (a) combining, at a point of intersection of the scan-line with a polygon edge, horizontal edges which are colinear with said scan-line and intersecting vertices into a colinear horizontal edge;
 (b) calculating the number of polygon edges positioned above said colinear horizontal edge which have a vertex coincident with said colinear horizontal edge into an above edge count;
 (c) calculating the number of polygon edges positioned below said colinear horizontal edge and which have a vertex coincident with said colinear horizontal edge into a below edge count;
 (d) comparing said above edge count and said below edge count, whereby if both said above edge count and below edge count have even parity, the parity of the crossed-edge count at the current point of intersection is inverted;
 (e) modifying the string of pixels along scan-line from the current point of intersection to the next point of intersection if the parity of the crossed-edge count for the current point of intersection is odd.

* * * * *